(12) United States Patent
Shah

(10) Patent No.: US 7,320,110 B2
(45) Date of Patent: *Jan. 15, 2008

(54) MULTIPLE LANGUAGE USER INTERFACE FOR THERMAL COMFORT CONTROLLER

(75) Inventor: Dipak J. Shah, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 930 days.

This patent is subject to a terminal disclaimer.

(21) Appl. No.: 10/453,563

(22) Filed: Jun. 3, 2003

(65) Prior Publication Data

US 2003/0206196 A1 Nov. 6, 2003

Related U.S. Application Data

(63) Continuation of application No. 09/706,077, filed on Nov. 3, 2000, now Pat. No. 6,621,507.

(51) Int. Cl.
*G06F 15/00* (2006.01)
*G06F 13/00* (2006.01)

(52) U.S. Cl. ..................... 715/764; 715/808

(58) Field of Classification Search ............... 715/771, 715/706, 839, 866, 808, 762–764, 784–788, 715/835; 345/440, 473
See application file for complete search history.

(56) References Cited

U.S. PATENT DOCUMENTS

| | | | |
|---|---|---|---|
| 4,079,366 A | 3/1978 | Wong | |
| 4,174,807 A | 11/1979 | Smith et al. | |
| 4,206,872 A | 6/1980 | Levine | |
| 4,224,615 A | 9/1980 | Penz | |
| 4,264,034 A | 4/1981 | Hyltin et al. | |
| 4,296,334 A | 10/1981 | Wong et al. | |
| 4,298,946 A | 11/1981 | Hartsell et al. | |
| 4,308,991 A | 1/1982 | Peinetti et al. | |
| 4,314,665 A | 2/1982 | Levine | |

(Continued)

FOREIGN PATENT DOCUMENTS

DE 3334117 4/1985

(Continued)

OTHER PUBLICATIONS

Blister Pack Insert from a Ritetemp 8082 Touch Screen Thermostat Product, 2 pages, 2002.

(Continued)

*Primary Examiner*—Cao (Kevin) Nguyen

(57) ABSTRACT

A multiple language user interface system for a thermal comfort controller. The user interface system has a central processing unit coupled to a memory, a language selector and a touch sensitive display unit. The memory can store at least one user interface object and at least one control algorithm. In some embodiments, the user interface system also has a network interface for connecting to the Internet or other network. In some embodiments, the first time the user interface system is powered-up after installation, a first set of user interface objects are displayed on the display unit and the user selects a preferred language. Once a preferred language is chosen, user interface objects can be loaded into the memory and the display unit will display the user interface objects in the preferred language. In some embodiments, control algorithms are loaded into memory.

13 Claims, 2 Drawing Sheets

U.S. PATENT DOCUMENTS

| | | |
|---|---|---|
| 4,332,352 A | 6/1982 | Jaeger |
| 4,337,822 A | 7/1982 | Hyltin et al. |
| 4,337,893 A | 7/1982 | Flanders et al. |
| 4,373,664 A | 2/1983 | Barker et al. |
| 4,379,483 A | 4/1983 | Farley |
| 4,382,544 A | 5/1983 | Stewart |
| 4,386,649 A | 6/1983 | Hines et al. |
| 4,388,692 A | 6/1983 | Jones et al. |
| 4,401,262 A | 8/1983 | Adams et al. |
| 4,431,134 A | 2/1984 | Hendricks et al. |
| 4,442,972 A * | 4/1984 | Sahay et al. .............. 236/1 EA |
| 4,446,913 A | 5/1984 | Krocker |
| 4,479,604 A | 10/1984 | Didner |
| 4,506,827 A | 3/1985 | Jamieson et al. |
| 4,556,169 A | 12/1985 | Zervos |
| 4,606,401 A | 8/1986 | Levine et al. |
| 4,621,336 A | 11/1986 | Brown |
| 4,622,544 A | 11/1986 | Bially et al. |
| 4,628,201 A | 12/1986 | Schmitt |
| 4,646,964 A | 3/1987 | Parker et al. |
| 4,717,333 A | 1/1988 | Carignan |
| 4,725,001 A | 2/1988 | Carney et al. |
| 4,837,731 A | 6/1989 | Levine et al. |
| 4,881,686 A | 11/1989 | Mehta |
| 4,914,568 A | 4/1990 | Kodosky et al. |
| 4,918,439 A | 4/1990 | Wozniak et al. |
| 4,948,040 A | 8/1990 | Kobayashi et al. |
| 4,992,779 A | 2/1991 | Sugino et al. |
| 4,997,029 A | 3/1991 | Otsuka et al. |
| 5,005,365 A | 4/1991 | Lynch |
| 5,012,973 A | 5/1991 | Dick et al. |
| 5,038,851 A | 8/1991 | Metha |
| 5,053,752 A | 10/1991 | Epstein et al. |
| 5,065,813 A | 11/1991 | Berkeley et al. |
| 5,086,385 A * | 2/1992 | Launey et al. ................ 700/83 |
| 5,088,645 A | 2/1992 | Bell |
| 5,140,310 A | 8/1992 | DeLuca et al. |
| 5,161,606 A | 11/1992 | Berkeley et al. |
| 5,170,935 A | 12/1992 | Federspiel et al. |
| 5,172,565 A | 12/1992 | Wruck et al. |
| 5,181,653 A | 1/1993 | Foster et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,289,362 A | 2/1994 | Liebl et al. |
| 5,329,991 A | 7/1994 | Metha et al. |
| 5,348,078 A | 9/1994 | Dushane et al. |
| 5,386,577 A | 1/1995 | Zenda |
| 5,404,934 A | 4/1995 | Carlson et al. |
| 5,482,209 A | 1/1996 | Cochran et al. |
| 5,526,422 A | 6/1996 | Keen |
| 5,537,106 A | 7/1996 | Mitcuhashi |
| 5,566,879 A | 10/1996 | Longtin |
| 5,570,837 A | 11/1996 | Brown et al. |
| 5,673,850 A | 10/1997 | Uptegraph |
| 5,682,206 A | 10/1997 | Wehmeyer et al. |
| 5,706,191 A | 1/1998 | Bassett et al. |
| 5,732,691 A | 3/1998 | Maiello et al. |
| 5,782,296 A | 7/1998 | Metha |
| 5,818,428 A | 10/1998 | Eisenbrandt et al. |
| 5,845,259 A | 12/1998 | West et al. |
| 5,873,519 A | 2/1999 | Beilfuss |
| 5,886,697 A | 3/1999 | Naughton et al. |
| 5,901,183 A | 5/1999 | Garin et al. |
| 5,902,183 A | 5/1999 | D'Souza |
| 5,915,473 A | 6/1999 | Ganesh et al. |
| 5,937,942 A | 8/1999 | Bias et al. |
| 5,947,372 A | 9/1999 | Tiernan |
| 5,950,709 A | 9/1999 | Krueger et al. |
| 6,020,881 A | 2/2000 | Naughton et al. |
| 6,032,867 A | 3/2000 | Dushane et al. |
| 6,059,195 A | 5/2000 | Adams et al. |
| 6,081,197 A | 6/2000 | Garrick et al. |
| 6,088,029 A | 7/2000 | Guiberson et al. |
| 6,098,893 A | 8/2000 | Berglund et al. |
| 6,101,824 A | 8/2000 | Meyer et al. |
| 6,104,963 A | 8/2000 | Cebasek et al. |
| 6,119,125 A | 9/2000 | Gloudeman et al. |
| 6,121,875 A | 9/2000 | Hamm et al. |
| 6,140,987 A | 10/2000 | Stein et al. |
| 6,141,595 A | 10/2000 | Gloudeman et al. |
| 6,149,065 A | 11/2000 | White et al. |
| 6,154,681 A | 11/2000 | Drees et al. |
| 6,167,316 A | 12/2000 | Gloudeman et al. |
| 6,192,282 B1 | 2/2001 | Smith et al. |
| 6,196,467 B1 | 3/2001 | Dushane et al. |
| 6,208,331 B1 | 3/2001 | Singh et al. |
| 6,216,956 B1 | 4/2001 | Ehlers et al. |
| 6,236,326 B1 | 5/2001 | Murphy |
| 6,259,074 B1 | 7/2001 | Brunner et al. |
| 6,285,912 B1 | 9/2001 | Ellison et al. |
| 6,290,140 B1 | 9/2001 | Pesko et al. |
| 6,315,211 B1 | 11/2001 | Sartain et al. |
| 6,318,639 B1 | 11/2001 | Toth |
| 6,320,577 B1 | 11/2001 | Alexander |
| 6,330,806 B1 | 12/2001 | Beaverson et al. |
| 6,344,861 B1 | 2/2002 | Naughton et al. |
| 6,351,693 B1 | 2/2002 | Monie et al. |
| 6,398,118 B1 | 6/2002 | Rosen et al. |
| 6,453,687 B2 | 9/2002 | Sharood et al. |
| 6,466,132 B1 | 10/2002 | Caronna et al. |
| 6,478,233 B1 | 11/2002 | Shah |
| 6,483,906 B1 | 11/2002 | Iggulden et al. |
| 6,502,758 B2 | 1/2003 | Cottrell |
| 6,518,953 B1 | 2/2003 | Armstrong |
| 6,518,957 B1 | 2/2003 | Lehtinen et al. |
| 6,546,419 B1 | 4/2003 | Humpleman et al. |
| 6,556,899 B1 | 4/2003 | Harvey et al. |
| 6,578,770 B1 | 6/2003 | Rosen |
| 6,580,950 B1 | 6/2003 | Johnson et al. |
| 6,581,846 B1 | 6/2003 | Rosen |
| 6,595,430 B1 | 7/2003 | Shah |
| 6,608,560 B2 | 8/2003 | Abrams |
| 6,619,555 B2 | 9/2003 | Rosen |
| 6,621,507 B1 | 9/2003 | Shah |
| 6,726,112 B1 | 4/2004 | Ho |
| 6,786,421 B2 | 9/2004 | Rosen |
| 6,789,739 B2 | 9/2004 | Rosen |
| 6,868,293 B1 | 3/2005 | Schurr et al. |
| 7,050,026 B1 | 5/2006 | Rosen |
| 7,152,806 B1 | 12/2006 | Rosen |
| 7,156,318 B1 | 1/2007 | Rosen |
| 2001/0029585 A1 | 10/2001 | Simon et al. |
| 2001/0042684 A1 | 11/2001 | Essalik et al. |
| 2001/0052459 A1 | 12/2001 | Essalik et al. |
| 2002/0005435 A1 | 1/2002 | Cottrell |
| 2002/0011923 A1 | 1/2002 | Cunningham et al. |
| 2002/0022991 A1 | 2/2002 | Sharood et al. |
| 2002/0060701 A1 | 5/2002 | Naughton et al. |
| 2002/0092779 A1 | 7/2002 | Essalik et al. |
| 2002/0096572 A1 | 7/2002 | Chene et al. |
| 2002/0138184 A1 | 9/2002 | Kipersztok et al. |
| 2002/0173929 A1 | 11/2002 | Seigel |
| 2003/0000692 A1 | 1/2003 | Okano et al. |
| 2003/0014179 A1 | 1/2003 | Szukala et al. |
| 2003/0033156 A1 | 2/2003 | McCall |
| 2003/0033230 A1 | 2/2003 | McCall |
| 2003/0034897 A1 | 2/2003 | Shamoon et al. |
| 2003/0034898 A1 | 2/2003 | Shamoon et al. |
| 2003/0074489 A1 | 4/2003 | Steger et al. |
| 2003/0121652 A1 | 7/2003 | Carey et al. |
| 2003/0123224 A1 | 7/2003 | LaCroix et at. |
| 2003/0136135 A1 | 7/2003 | Kim et al. |

| | | | |
|---|---|---|---|
| 2003/0142121 | A1 | 7/2003 | Rosen |
| 2003/0150926 | A1 | 8/2003 | Rosen |
| 2003/0150927 | A1 | 8/2003 | Rosen |
| 2003/0208282 | A1 | 11/2003 | Shah |
| 2004/0074978 | A1 | 4/2004 | Rosen |
| 2004/0245352 | A1 | 12/2004 | Smith |
| 2004/0262410 | A1 | 12/2004 | Hull |

FOREIGN PATENT DOCUMENTS

| | | |
|---|---|---|
| DE | 29600654 | 4/1996 |
| DE | 198 40 552 A1 | 3/2000 |
| EP | 0070414 | 1/1983 |
| EP | 0 332 957 A1 | 9/1989 |
| EP | 0434926 | 8/1995 |
| EP | 0 978 692 A2 | 2/2000 |
| EP | 0678204 | 3/2000 |
| EP | 0985994 | 3/2000 |
| EP | 1033641 | 9/2000 |
| EP | 1074009 | 7/2001 |
| FR | 2711230 | 4/1995 |
| WO | WO 97/11448 | 3/1997 |
| WO | WO 97/39392 | 10/1997 |
| WO | WO 00/43870 | 7/2000 |
| WO | WO 01/52515 | 7/2001 |
| WO | WO 01/79952 | 10/2001 |

OTHER PUBLICATIONS

Operation Manual for Ritetemp Touch Screen Thermostat 8082, 8 pages, 2002.
Trouble Shooting Guide for Ritetemp Thermostat 8082, 1 page, 2002.
Quick Start Guide for Ritetemp Thermostat 8082, 1 page, 2002.
Install Guide for Ritetemp Thermostat 8082, 6 pages, 2002.
Remote Control Power Requirement for Ritetemp Thermostat 8082, 1 page, 2002.
Mounting Template for Ritetemp Thermostat 8082, 1 page, 2002.
"A Full Range of Alternative User Interfaces For Building Occupants and Operators," http://www.automatedbuildings.com/news/jan00/articles/andover/andover.htm, 5 pages, dated Jan. 2000, printed Sep. 20, 2004.
"CorAccess Systems/In Home," http://web.archive.org/web20011212084427/www.coraccess.com/home.html, 1 page, copyright 2001, printed Aug. 19, 2004.
"HAI Company Background," http://www.homeauto.com/AboutHAI/abouthai_main.htm, 2 pages, printed Aug. 19, 2004.
"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.
"Home Toys Review—Touchline", http://www.hometoys.com/htinews/aug99/reviews/touchlinc/touchlinc.htm, 3 pages, dated Aug. 1999, printed Aug. 20, 2004.
"HTI News Release," http://www.hometoyes.com/htinews/apr99/releases/ha101.htm, 3 pages, Apr. 1999.
"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"Product Review—Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
"Spotlight on integrated systems," Custom Builder, V8, N2, p. 66(6), Mar.-Apr. 1993.
"Vantage Expands Controls For Audio/Video, HVAC and Security," http://www.hometoys.com/htinews/aug99/releases/vantage03.htm, 2 pages, dated Aug. 3, 1999, printed Aug. 20, 2004.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 5 pages, May 2001; First Sale Feb. 2001.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temperature, Humidity & Valves," Dwyer Instruments, Inc., 5 pages, printed Sep. 20, 2004.
Blake et al., "Seng 310 Final Project Demo Program" Illustration, 3 pages, Apr. 6, 2001.
Blake et al., "Seng 310 Final Project" Report, dated Apr. 6, 2001.
Braeburn Model 3000 Owner's Manual, pp. 1-13, 2001.
Braeburn Model 5000 Owners Manual, pp. 1-17, 2001.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreeens," p1174 (2 pages), Jan. 6, 1999.
Cardio Manual, available at http://www/secant.ca/En/Documentation/Cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews Review," Feb 1998, 5 pages, printed Sep. 14, 2004.
Carrier Microelectronic Programmable Thermostat Owner's Manual, pp. 1-24, May 1994.
Carrier, "Programmable Dual Fuel Thermostat," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8, 1998.
Carrier, "Thermidistat Control, Installation, Start-Up, and Operating Instructions," pp. 1-12, Aug. 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," pp. 188-189, 2002.
Domotique Secant Home Automation—Web Page, available at http://www.secant.ca/En/Company/Default.asp, 1 page, printed Sep. 28, 2004.
Freudenthal et al., "Communicating extensive smart home functionality to users of all ages: the design of a mixed-initiative multimodal thermostat-interface,"pp. 34-49, Mar. 12-13, 2001.
Gentex Corporation, HD135, 135° Fixed Temperature Heat Detector AC Pwered, 120V, 60Hz With Battery Backup, Installation Instructions—Owner's Information, pp. 9-1 to 9-6, Jan. 1, 1993.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System For Boiler Plant and Combustion Safety Processes," 4 pages, Dec. 15, 1995.

Honeywell T8002 Programmable Thermostat, Installation Instructions, pp. 1-8, 2002.

Honeywell T8602A,B,C,D and TS9602A,C Chronotherm III Fuel Saver Thermostats, Installation Instructions, pp. 1-12, 1995.

Honeywell T8602D Chronotherm IV Deluxe Programmable Thermostats, Installation Instructions, pp. 1-12, 2002.

Honeywell TH8000 Series Programmable Thermostats, Owner's Guide, pp. 1-44, 2004.

Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.

Honeywell, "W7006A Home Controller Gateway User Guide," 31 pages, Jul. 2001.

Honeywell, MagicStat® CT3200 Programmable Thermostat, Installation and Programming Instructions, pp. 1-24, 2001.

http://www.cc.gatech.edu/computing/classes/cs6751_94_fall/groupc/climate-2/node1.html, "Contents," 53 pages, printed Sep. 20, 2004.

http://www.ritetemp.info/rtMenu_13.html, Rite Temp 8082, 8 pages, printed Jan. 20, 2003.

http://www.thermostatsales.com, Robertshaw, "9610 Digital Programmable Thermostat," 3 pages, printed Jun. 17, 2004.

http://www.thermostatsales.com, Robertshaw, "9700 Duluxe Programmable Thermostat" 3 pages, printed Jun. 17, 2004.

http://www.thermostatsales.com, Robertshaw, "9710 Deluxe Programmable Thermostat," 3 pages, printed Jun. 17, 2004.

http://www.thermostatsales.com, Robertshaw, "9720 Deluxe Programmable Thermostat," 3 pages, printed Jun. 17, 2004.

METASYS, "HVAC PRO for Windows User's Manual," 308 pages, 1998.

Ritetemp Operation 8029, 3 pages, Jun. 19, 2002.

Ritetemp Operation 8050, 5 pages, Jun. 26, 2002.

Totaline Star CPE230RF, Commercial Programmable Thermostat Wireless Transmitter, Owner's Manual, pp. 1-16, Oct. 1998.

Totaline, "1 For All programmable Digital Thermostat," Owner's Manual P/N P374-1100FM, 23 pages, Nov. 1998.

Totaline, "Intellistat Combination Temperature and Humidity Control," Owner's Manual P/N P374-1600, 25 pages, Jun. 2001.

Totaline, "Programmable Thermostat Configurable for Advanced Heat Pump or Dual Fuel Operation," Owner's Manual P/N P374-1500, 24 pages, Jun. 1999.

Totaline, "Instructions P/N P474-1010", Manual, 2 pages, Dec. 1998.

Totaline, "Programmable Thermostat", Homeowner's Guide, 27 pages, Dec. 1998.

Totaline, "Wireless Programmable Digital Thermostat," Owner's Manual 474-1100RF, 21 pages, 2000.

Visor Handheld User Guide, Copyright 1999-2000.

* cited by examiner

US 7,320,110 B2

MULTIPLE LANGUAGE USER INTERFACE FOR THERMAL COMFORT CONTROLLER

This application is a continuation of prior U.S. application Ser. No. 09/706,077 filed Nov. 3, 2000, now U.S. Pat. No. 6,621,507.

BACKGROUND OF THE INVENTION

The present invention relates to thermostats and other thermal comfort controllers and particularly to a multiple language user interface for such thermal comfort controllers.

Current thermal comfort controllers, or thermostats, have a limited user interface which typically includes a number of data input buttons and a small display. Hereinafter, the term thermostat will be used to reference a general comfort control device and is not to be limiting in any way. For example, in addition to traditional thermostats, the present such control device could be a humidistat or used for venting control. As is well known, thermostats often have setback capabilities which involves a programmed temperature schedule. For example, a temperature schedule could be programmed so that in the winter months, a house is warmed to 72 degrees automatically at 6:00 a.m. when the family awakes, cools to 60 degrees during the day while the family is at work and at school, re-warms to 72 degrees at 4:00 p.m. and then cools a final time to 60 degrees after 11:00 p.m., while the family is sleeping. Such a schedule of lower temperatures during off-peak hours saves energy costs.

A schedule of set back temperatures is one example of a control algorithm that can be used by the comfort controller. Of course, such control algorithms will be different for different climates. The control algorithms also vary based on personal preferences. Some people like their homes warmer in the winter than other people do.

Programmable comfort controllers have been troublesome in the past because users often do not understand how to correctly program the controllers. For people whose first language is not English, or for people travelling to a foreign country and staying in a hotel or other housing, programming comfort controllers can be even more difficult because the buttons, controls, and displays on the controllers are usually labeled with English words.

What is needed in the art is a user interface for a thermostat in which the temperature schedule is more easily programmed. To make the programming easier, users should be able to choose a preferred language and then view the switches, etc. on the comfort controller in the chosen preferred language. In addition, to make programming and using the controllers easier, different control algorithms should be available to the user to choose from. The different control algorithms might be programmed during manufacturing, or loaded over the Internet or other network after installation.

SUMMARY OF THE INVENTION

This invention can be regarded as a multiple language user interface system for thermal comfort controllers. The user interface system includes a central processing unit, a memory, a display with a touch-sensitive screen used for input, and a language selector. Some embodiments also include a network interface. The memory can store at least one control algorithm and at least one user interface object. The language selector is used to choose a preferred language. Once a preferred language is chosen, the display unit uses the user interface objects in the memory that match the preferred language. In this way, the controls, labels, etc. that are presented to the user on the display unit are in the user's preferred language. In one embodiment, when the comfort controller is first powered-up after installation, the user may be asked to select the preferred language and then the user interface objects may be loaded. In some embodiments, the user interface objects are loaded from the Internet. Control algorithms may also be loaded so that the user can choose from one that is suited for the user's climate and personal preferences.

DESCRIPTION OF PREFERRED EMBODIMENTS OF THE INVENTION

The present invention is a multiple language user interface system for a thermostat or other comfort controller. Throughout the drawings, an attempt has been made to label corresponding elements with the same reference numbers. The reference numbers include:

| Reference Number | Description |
| --- | --- |
| 100 | Central Processing Unit |
| 200 | Display Unit |
| 300 | Memory |
| 400 | User Interface Object(s) |
| 500 | Control Algorithm(s) |
| 600 | Initial Interface Object(s) |
| 700 | Stylus |
| 800 | Conduits to Heating/Cooling Devices, Thermostat, etc. |
| 905 | Additional Controls |
| 910 | Other Data |
| 915 | Buttons |
| 920 | Labels |
| 950 | Network Interface |

Figure 1:
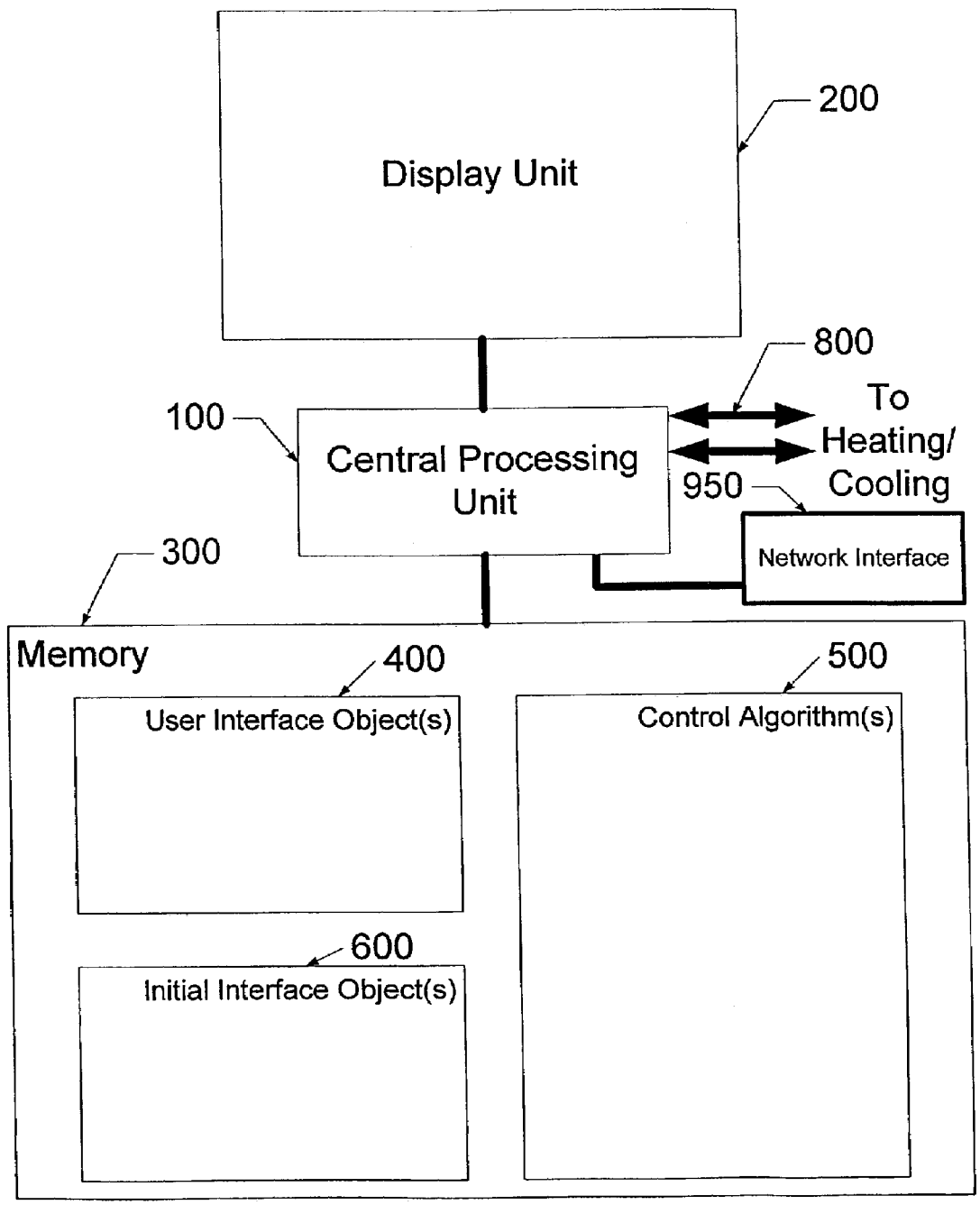
FIG. 1 is a block diagram of a user interface system for a thermal comfort controller, in accordance with the present invention.

Referring to the drawings, FIG. 1 is a block diagram of one embodiment of the user interface system for a comfort controller. The user interface system includes a central processing unit 100. This central processing unit 100 is coupled to a display unit 200, a network interface 950, and a memory 300. The display unit 200 has a touch-sensitive screen which allows the user to input data without the need for a keyboard or mouse. The memory 300 can store one or more user interface objects 400 and one or more control algorithms 500. In some embodiments, the memory 300 can also store one or more initial interface objects 600. The user interface system also has conduits 800 to the heating/cooling devices or thermostats thereof so that user interface system can communicate with the thermostat or other comfort controller.

The display unit 200 includes a graphical display/touch sensitive screen. This configuration provides for very flexible graphical display of information along with a very user friendly data input mechanism. The display unit 200 may be very similar to the touch screen display used in a hand-held personal digital assistant ("PDA"), such as a Palm brand PDA manufactured by 3Com, a Jornada brand PDA manufactured by Hewlett Packard, etc. Of course the graphical user interface system could also be manufactured to be integrated with a thermostat itself. In such an embodiment, a touch-sensitive LCD display is coupled with the thermostat's existing central processing unit and RAM.

The control algorithms 500 are programmed or selected by the user. One such control algorithm 500 would be a set-point schedule containing a list of times associated to a list of temperatures. The thermal controller sets-up or sets-back the temperature according to such a set-point schedule. For example, a set-point schedule could be configured to adjust the temperature to 60 degrees at 6:00 a.m., then to 67 degrees at 6:30 a.m., and up to 73 degrees at 8:00 a.m., etc.

Figure 2:
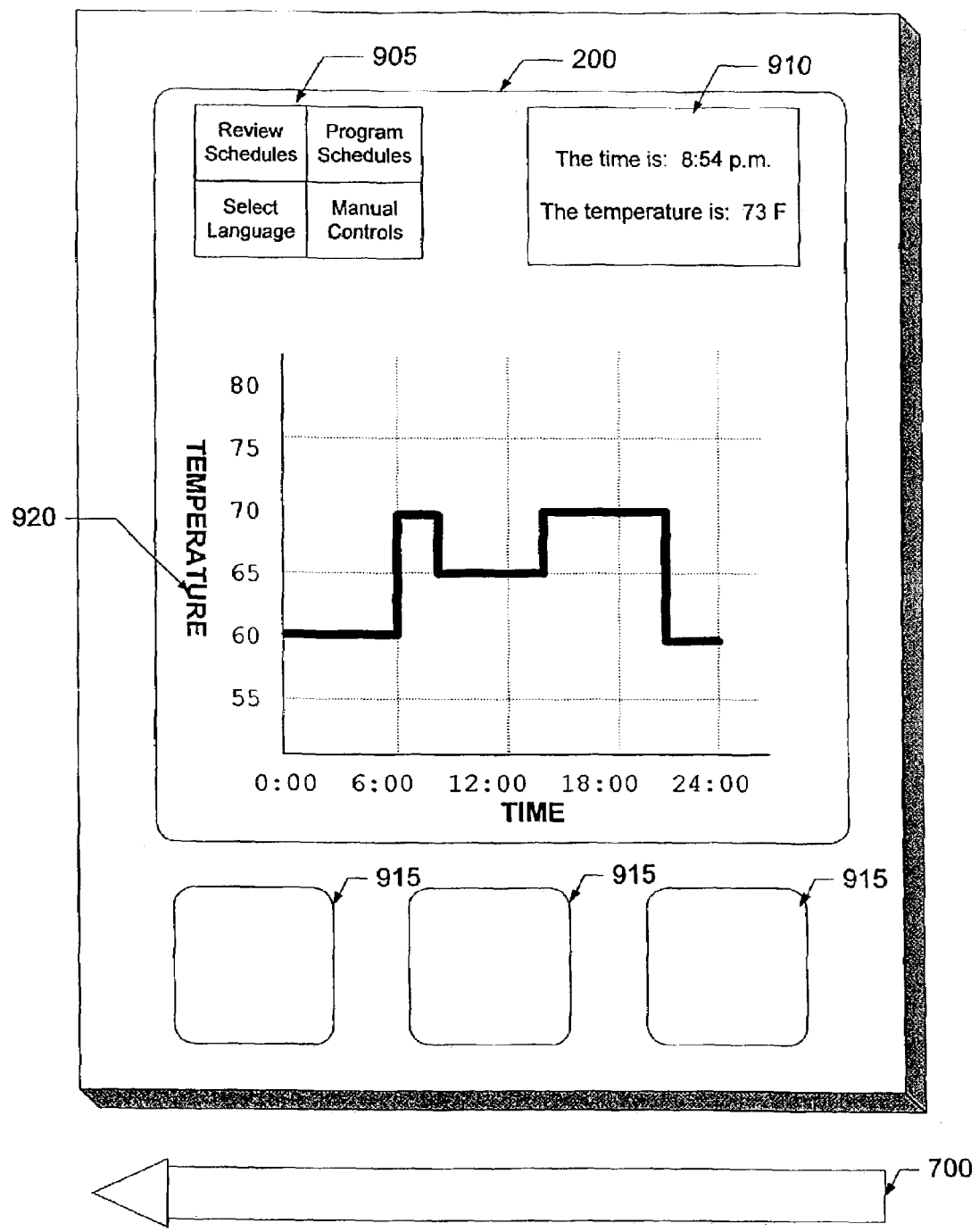
FIG. 2 is a perspective view of the user interface system in an embodiment with a stylus, in accordance with the present invention.

FIG. 2 shows a perspective view of one possible embodiment of the user interface system with a stylus 700. In FIG. 2, the user interface system has been installed as an integral element of the thermostat wall unit. The display unit 200 of the user interface system displays the graphical representation of the set-point temperature schedule. These graphical representations are presented as a graph in which one axis denotes time and the other axis denotes temperatures. The graph is labeled 920. Other data 910 is also displayed, including the time and temperature. Of course, other data could also be displayed, such as the current date, day of the week, indoor and/or outdoor relative humidity, etc.

The display unit 200 can also be configured with additional controls 905, which could, for example, switch the display between Fahrenheit and Celsius for the temperature, between standard and military time, and between showing a single day's schedule versus showing a week's schedule. The additional controls 905 are labeled. In FIG. 2, there is a control to review the schedules, one to program new schedules, and one to manually control the heating or cooling of the house. In addition to the additional controls 905 programmed and displayed on display unit 200, physical buttons 915 of the thermostat could be programmed to be used for working with the user interface system as well. This is similar to the operation of a PDA.

There is also an additional control 905 in FIG. 2 which allows the user to select a preferred language. Once a preferred language is chosen, the display unit uses user interface objects 400 in the memory to correctly display all of the textual information in the preferred language. For example, in FIG. 2, if a language other than English was chosen, the additional controls 905, the display information 910, and the labels 920 would be redisplayed in the chosen language. This makes the comfort controller easier to use by someone for whom English is not his or her first language.

In one embodiment of the invention, the comfort controller would be installed without any user interface objects, initial interface objects, or control algorithms stored in memory. When first powered-up after installation, the comfort controller is programmed to load the initial interface objects 600 via the network interface 950. For example, the comfort controller could retrieve the initial interface objects 600 from a web page on the Internet. Or the comfort controller's network interface 950 could include a modem connected to a phone line. In such an embodiment, the initial interface objects 600 can be downloaded as files. The initial interface objects 600 are presented on the display unit 200 and request the user to choose a preferred language. Once the preferred language is chosen, the proper user interface objects 400 are then downloaded. In another embodiment, the comfort controller can be connected via the network interface 950 to a PDA, laptop computer, or similar device carried by the comfort controller installer. The installer's PDA or computer can have libraries of control algorithms, initial interface objects, and user interface objects accessible from memory which can be transferred by a cable, infra-red port, radio-frequency port or other communication method.

Of course, because memory is now so economical some embodiments of the current invention are shipped from the manufacturer with the initial interface objects and many language versions of the user interface objects 400 already stored in memory 300. If enough languages are stored in memory 300, the network interface 950 is not necessary. Otherwise, it is only necessary if the preferred language is one that does not already have user interface objects 400 in memory 300.

Likewise, some embodiments are shipped with control algorithms 500 already stored in memory. The user can pick and choose from these algorithms or can choose to download updated or additional control algorithms 500 via the network interface 950.

The graphical representations, controls and other data that are displayed on display unit 200 are managed by a computer program stored in memory 300. The computer program could be written in any computer language. Possible computer languages to use include C, Java, and Visual Basic.

There are many ways in which the user interface system can work with the thermal comfort controller. The user interface system would probably be integrated into a thermal comfort control system and installed on a wall much like current programmable thermostats. However, if the user interface system is configured on a hand-held PDA, the user-interface could communicate with the thermal comfort controller via the PDA's infra-red sensor. Or, the PDA could be synchronized with a personal computer and the personal computer could set the appropriate instructions to the thermal comfort controller. Or, the PDA could use a cellular/mobile phone feature to telephone the controller (i.e., thermostat, personal computer, etc.) to exchange pertinent and relevant data.

From the foregoing detailed description, it will be evident that there are a number of changes, adaptations and modifications of the present invention which come within the province of those skilled in the art. However, it is intended that all such variations not departing from the spirit of the invention be considered as within the scope thereof.

What is claimed is:

1. A user interface system for a programmable comfort controller, comprising:
   a central processing unit;
   a memory capable of storing at least one user interface object and at least one control algorithm, the memory coupled to the central processing unit;
   a display unit coupled to the central processing unit, for displaying the user interface objects and for allowing a user to program the control algorithms; and
   a language selector which allows a preferred language of a user to be selected, so that the display unit can display the user interface objects that are in the preferred language.

2. The user interface system of claim 1, further comprising a network interface for connecting to a network, the network interface coupled to the central processing unit.

3. The user interface system of claim 1, further comprising at least one initial interface object, stored in the memory, the initial interface objects used by the language selector in allowing the preferred language to be selected.

4. The user interface system of claim 2, wherein the network interface connects the user interface system to the Internet.

5. The user interface system of claim 2, wherein the network interface connects the user interface system to a telephony network.

6. The user interface system of claim 2, wherein the network interface connects the user interface system to a cellular telephony network.

7. The user interface system of claim 2, wherein the network interface uses infra-red coupling to connect the user interface system to the network.

8. The user interface system of claim 2, wherein the network interface uses radio frequency coupling to connect the user interface system to the network.

9. A method for programming a thermal comfort controller with a user interface system having a central processing unit, a memory capable of storing at least one user interface object and at least one control algorithm, a display unit for displaying the user interface objects and for allowing a user to program the control algorithms, and a language selector which allows a preferred language of a user to be selected so that the display unit can display the user interface objects that are in the preferred language, wherein the memory, the language selector and the display unit are coupled to the central processing unit, the method comprising:
   loading at least one initial interface object into the memory, for use by the language selector;
   displaying the initial interface objects to request the user to choose a language;
   selecting a preferred language with the language selector; and
   loading at least one user interface object into the memory, for use by the display unit in displaying user interface objects that are in the preferred language.

10. The method for programming a thermal comfort controller from claim 9, further comprising loading at least one control algorithm into the memory.

11. The method for programming a thermal comfort controller from claim 9, wherein the step of loading at least one initial interface object is initiated when the thermal comfort controller is first powered-up after being installed.

12. The method for programming a thermal comfort controller from claim 9, wherein the step of loading at least one user interface object into the memory accesses the Internet.

13. An interactive display unit, comprising:
   a central processing unit;
   a memory capable of storing at least one user interface object and at least one control algorithm, the memory coupled to the central processing unit;
   a display unit coupled to the central processing unit, for displaying the user interface objects and for allowing a user to program the control algorithms; and
   a language selector which allows a preferred language of a user to be selected, so that the display unit can display the user interface objects that are in the preferred language.

* * * * *